United States Patent
Domercq et al.

(10) Patent No.: US 9,334,878 B2
(45) Date of Patent: May 10, 2016

(54) VORTEX GENERATORS FOR GENERATING VORTICES UPSTREAM OF A CASCADE OF COMPRESSOR BLADES

(75) Inventors: Olivier Stephane Domercq, Brie Comte Robert (FR); Vincent Paul Gabriel Perrot, Maisons Alfort (FR); Agnes Pesteil, Alfortville (FR)

(73) Assignee: SNECMA, Paris (FR)

( * ) Notice: Subject to any disclaimer, the term of this patent is extended or adjusted under 35 U.S.C. 154(b) by 634 days.

(21) Appl. No.: 13/698,850

(22) PCT Filed: May 25, 2011

(86) PCT No.: PCT/FR2011/051191
§ 371 (c)(1),
(2), (4) Date: Nov. 19, 2012

(87) PCT Pub. No.: WO2011/148101
PCT Pub. Date: Dec. 1, 2011

(65) Prior Publication Data
US 2013/0064673 A1    Mar. 14, 2013

(30) Foreign Application Priority Data
May 26, 2010  (FR) .................................. 10 02215

(51) Int. Cl.
*F04D 29/68* (2006.01)
*F04D 29/32* (2006.01)
*F04D 29/54* (2006.01)

(52) U.S. Cl.
CPC ............ *F04D 29/681* (2013.01); *F04D 29/321* (2013.01); *F04D 29/541* (2013.01)

(58) Field of Classification Search
None
See application file for complete search history.

(56) References Cited

U.S. PATENT DOCUMENTS

| 5,211,533 | A | 5/1993 | Walker et al. |
| 5,836,744 | A | 11/1998 | Zipps et al. |
| 6,146,099 | A | 11/2000 | Zipps et al. |
| 7,195,454 | B2 * | 3/2007 | Lu et al. .................. 415/181 |
| 8,591,176 | B2 * | 11/2013 | Guemmer .................. 415/116 |
| 2009/0317232 | A1 | 12/2009 | Guemmer |

OTHER PUBLICATIONS

International Search Rpoert Issued Aug. 24, 2011 in PCT/FR11/051191 Filed May 25, 2011.
U.S. Appl. No. 13/935,827, filed Jul. 5, 2013, Perrot et al.

* cited by examiner

*Primary Examiner* — Ninh J Nguyen
*Assistant Examiner* — Justin Seabe
(74) *Attorney, Agent, or Firm* — Oblon, McClelland, Maier & Neustadt, L.L.P.

(57) ABSTRACT

A blade assembly for a turbomachine compressor includes a plurality of individual devices acting on the flow. The individual devices are provided upstream of the blade assembly and are formed at least so as to generate vortices. Each of the individual devices is arranged on an upstream face of a shroud around which a recirculating flow passes, circulating in a cavity. The recirculating flow is reinjected into the principal flow such that the individual devices act simultaneously on the principal flow and on the recirculating flow.

16 Claims, 4 Drawing Sheets

VORTEX GENERATORS FOR GENERATING VORTICES UPSTREAM OF A CASCADE OF COMPRESSOR BLADES

BACKGROUND OF THE INVENTION

1. Field of the Invention

The present invention relates to the field of blade assemblies for a turbomachine compressor, such as a turbojet or a turboshaft engine for a helicopter. The invention also relates to a compressor comprising such a blade assembly, in particular a rectifier for a high pressure compressor.

2. Description of the Related Art

It is known that the compression system for a turbojet (and the high pressure compressor, in particular) is one of the most critical components of the engine. The compressor of a turbojet consists of a plurality of successive compression stages, each stage comprising two blade assemblies, namely a rotor and a rectifier (stator). The rectifier comprises, in the usual manner, an internal shroud and an external shroud which are coaxial, in addition to blades which are arranged adjacent to one another between said internal and external shrouds and which are connected thereto by their ends, as disclosed, for example, in the document FR-2 896 019.

To ensure the operation of a compressor, clearance is present at each stage between the rectifier and the hub, forming a cavity below the rectifier. Generally, a leakage flow circulates in said cavity, in the direction from downstream to upstream of said rectifier, passing below the radially internal end of the internal shroud. Said leakage flow is then reinjected into the airflow, upstream of the rectifier.

Said leakage flow interferes with the principal flow and contributes to the generation of stall. In particular, it alters the flow conditions upstream of the blades, it promotes the occurrence of corner stall and increases the associated losses.

Thus, two main sources of losses coexist in this area of the compressor: those due to the recirculation below the stator and those caused by corner stall.

In addition, to reduce the losses effectively, it is necessary to take action on both of said phenomena at once.

To reduce stall, a system which uses vortex generators arranged on the hub, upstream of the fixed or mobile wheels of a compressor, is disclosed in the document WO-2008/046389. Said vortex generators which are provided on the upstream internal and/or external duct wall generate wake vortices which increase the energy of the boundary layer on the channel wall. An increase in the flow component is produced in the direction of the principal flow, in the vicinity of the wall, which advantageously acts on the stall in the region of the fixed and mobile blades.

The system disclosed in said document WO-2008/046389 which solely acts on the principal flow only deals with one of the two aforementioned problems of stall, even though said two problems are associated. This usual solution is thus not completely satisfactory to reduce losses in the region of the rectifier.

BRIEF SUMMARY OF THE INVENTION

The Applicant has set himself the object of providing a blade assembly which makes it possible to limit, or even eliminate, simultaneously the aforementioned two types of losses.

According to the invention, a blade assembly for a turbomachine compressor comprising a plurality of individual devices acting on the flow, which are formed at least so as to generate vortices, is characterized in that each of said individual devices is provided upstream of said assembly so as to act simultaneously on the principal flow and on a recirculating flow.

The solution proposed by the present invention thus consists in providing devices for generating vortices which act simultaneously on the principal flow and on the recirculating flow, and thus act simultaneously on the two aforementioned sources of losses which makes it possible to reduce the losses effectively.

More specifically, vortices are created when the principal flow in the airflow and the recirculating flow leaving the cavity encounter said devices according to the invention. Said vortices permit a transfer of energy from the principal flow to the boundary layers. The boundary layers are thus accelerated. As the low speeds at the foot of the stator, on the upper surface in the case of a rectifier, are responsible for the corner vortex, said corner vortex is thus reduced.

One advantage of the solution according to the present invention and the variants thereof is to limit to a maximum extent the impact on the axial length of the compressor.

In a particular embodiment, at least some (and preferably all) of said individual devices generating vortices comprise indentations which are formed directly in the upstream face of a shroud around which said recirculating flow passes.

Within the scope of the present invention:
the concepts of "upstream" and "downstream" are defined relative to the direction of the principal flow of air in the blade assembly and the compressor; and
the term "radial" is relative to the axis of the compressor.

In a preferred embodiment, said individual devices for generating vortices are also formed so as to guide at least said recirculating flow. To this end, at least some of said devices preferably comprise ribs which are arranged in the region of the upstream face of a shroud around which said recirculating flow passes.

Said preferred embodiment thus provides on said shroud, at the outlet of the cavity, devices which both guide the fluid at the outlet of the cavity and generate vortices making it possible to control the stall (at the foot or the head) of the blade assembly.

Moreover, some of said devices may be advantageously arranged:
either between two successive blades. In this case, a preferred position is located one third of the distance along the inter-blade channel, on the upper surface viewed from the upstream direction;
or, in each case directly upstream of a blade.

Moreover, said devices may be provided over the entire circumference or simply over part of the circumference of the blade assembly.

In a first preferred embodiment, said blade assembly corresponds to a rectifier for a turbomachine compressor, said rectifier comprising an external shroud and an internal shroud which are coaxial, in addition to blades which are arranged adjacent to one another between said external and internal shrouds and which are connected thereto by their ends, said rectifier also comprising a plurality of individual devices acting on the flow which are provided on the internal shroud, each of said devices being provided in the region of the upstream face of the internal shroud, in the vicinity of the radially external side, so as to act simultaneously on the principal flow and on the recirculating flow which corresponds to the flow of fluid passing below the radially internal side of the internal shroud, coming from the downstream face.

Moreover, in a second embodiment, said blade assembly corresponds to a rotor for a turbomachine compressor, said rotor comprising an internal shroud and an external shroud which are coaxial, in addition to blades which are arranged adjacent to one another between said internal and external shrouds and which are connected thereto by their ends, said rotor also comprising a plurality of individual devices acting on the flow which are provided on the external shroud, each of said devices being provided in the region of the upstream face of the external shroud, so as to act simultaneously on the principal flow and on the recirculating flow which corresponds to the flow of fluid passing on the radially external side of the external shroud, coming from the downstream face.

Whatever the embodiment, the reduction of stall, obtained by means of the invention, makes it possible to improve the efficiency of the compressor and contributes to increasing the stability range.

Moreover, a single type of device makes it possible to control the flow in the cavities and to reduce the associated stall. Moreover, said devices are fixed or manufactured directly in the platform (shroud) of the rectifier or rotor, which limits problems of integration or manufacture.

In addition, the present invention also relates to a turbomachine compressor which comprises at least one blade assembly (rectifier, rotor) as mentioned above and/or a turbomachine, in particular an aircraft turbojet engine, which comprises such a compressor.

BRIEF DESCRIPTION OF THE SEVERAL VIEWS OF THE DRAWINGS

Further features and advantages will become apparent from reading the following description and referring to the accompanying drawings, in which.

DETAILED DESCRIPTION OF THE INVENTION

Figure 1:
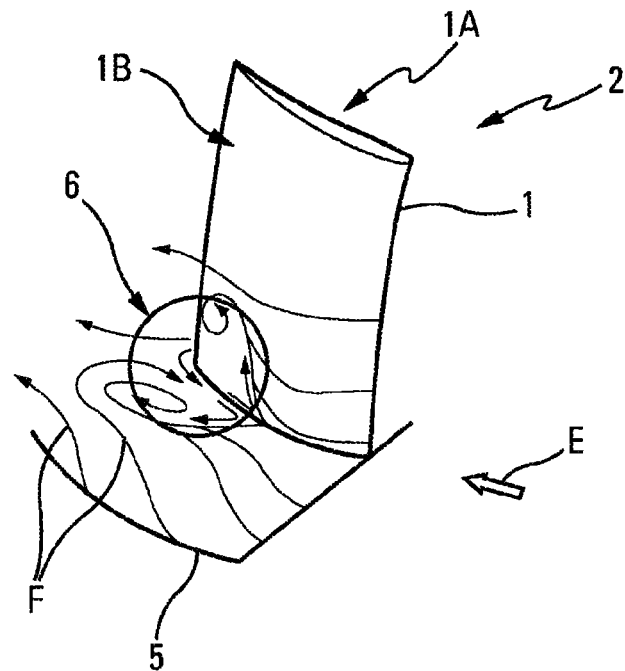
FIG. 1 shows schematically a blade of a compressor rectifier.
Figure 3:
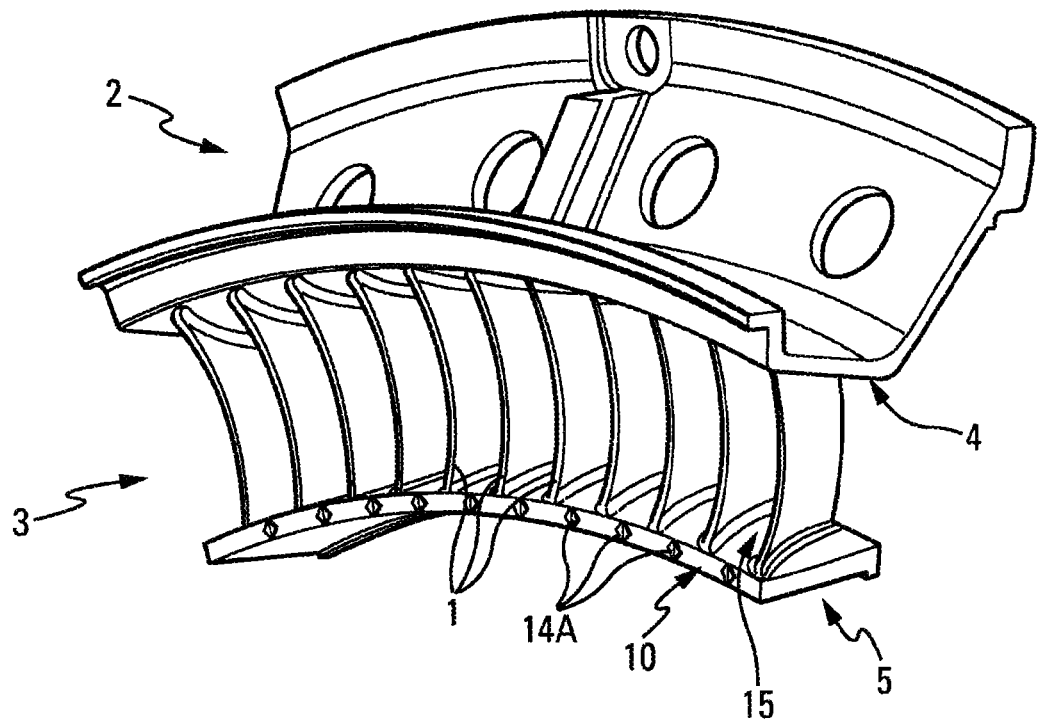
FIG. 3 shows a partial perspective view of a rectifier of a high pressure compressor of a turbomachine, comprising devices acting on the flow, according to a first embodiment of the invention.
Figure 5:
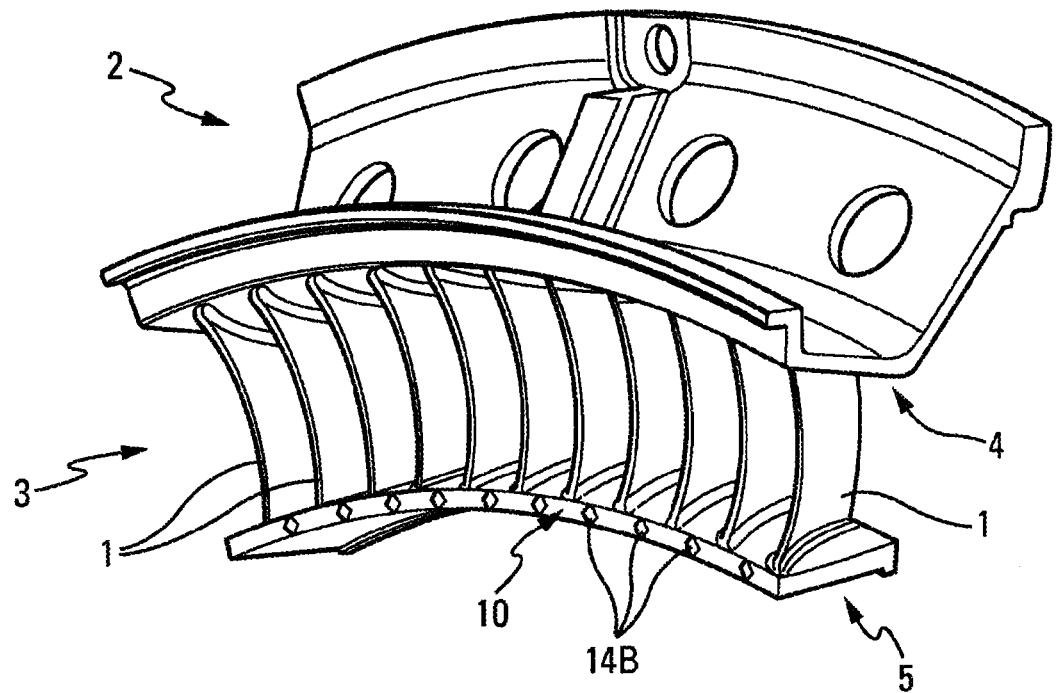
FIG. 5 shows a partial perspective view of a rectifier of a high pressure compressor of a turbomachine comprising devices acting on the flow, according to a second preferred embodiment of the invention.

A blade 1 of a rectifier 2, as shown partially in FIGS. 3 and 5, has been shown in FIG. 1. Said rectifier 2 forms part of a turbomachine compressor 3, in particular an aircraft turbojet engine. A compressor 3 comprises, in the usual manner, a plurality of successive compression stages, each stage consisting of a rotor 22 and a rectifier 2 (stator).

Said rectifier 2 comprises a (radially) external shroud 4 and a (radially) internal shroud 5 which are support shrouds for blades 1. Said two shrouds 4 and 5 are concentric and a plurality of blades 1 extend substantially radially from one to the other of said shrouds 4 and 5 to which they are fixed, said blades 1 being spaced apart circumferentially, preferably in a uniform manner.

Within the scope of the present invention:
the concepts of "upstream" and "downstream" are defined relative to the direction of the principal flow of air in the rectifier 2 and the compressor 3; and
the term "radial" is relative to the axis of the compressor 3.

The direction of the principal flow of fluid has been shown by means of an arrow E and local circulation of fluid present at the foot of the blade 1 (lower surface 1A and upper surface 1B) has been shown by means of arrows F in thin lines in FIG. 1. At the foot of the blade 1, an area 6 of corner stall is present on the upper surface 1B thereof.

Figure 2:
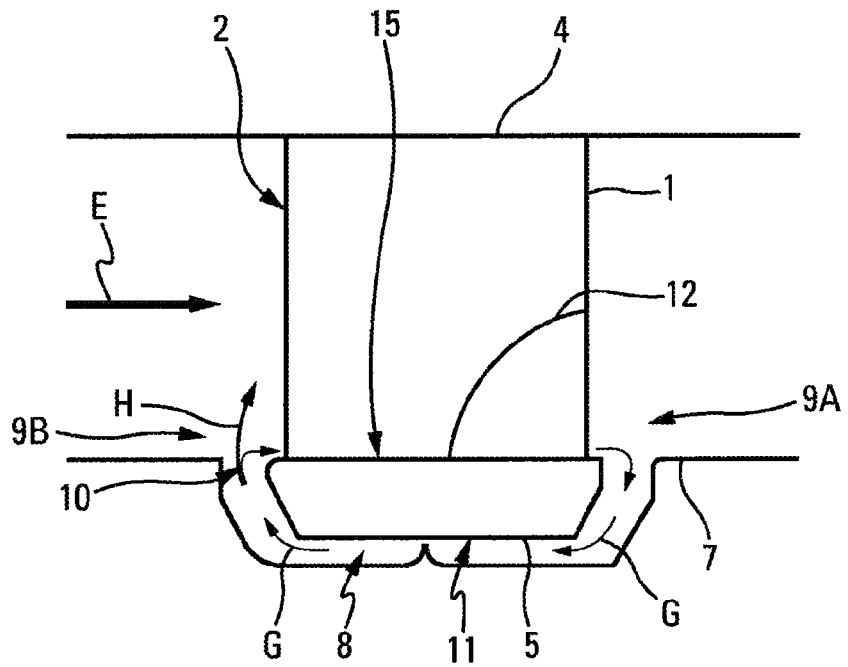
FIG. 2 is a view showing stall occurring in the region of a blade as shown in FIG. 1.

To ensure the operation of a compressor 3, clearance is present at each stage between the rectifier 2 and the hub 7, said clearance creating a cavity 8 known as the cavity below the rectifier, as shown in FIG. 2. Generally, a leakage flow (illustrated by arrows G) circulates in said cavity 8, from the downstream face 9A of the rectifier 2 to the upstream face 9B passing below the radially internal side 11 of the internal shroud 5. Said leakage flow is then reinjected into the airflow, upstream of the rectifier 2, as shown in particular by an arrow H. Said leakage flow interrupts the principal flow (illustrated by the arrow E) and contributes to the generation of stall, shown schematically by a line 12 in FIG. 2. In particular, the leakage flow modifies the flow conditions upstream of the blades 1, promotes the occurrence of corner stall and increases the associated losses. Thus, two sources of losses coexist in said region of the compressor 2: those due to the recirculation in the cavity below the rectifier 8 and those caused by the corner stall 6.

The present invention proposes a solution which makes it possible to act simultaneously on said two phenomena to reduce the associated losses effectively.

To achieve this, the rectifier 2 comprises a plurality of individual devices 14A, 14B which act on the flow. Each of said devices 14A, 14B is provided in the region of the upstream face 10 of the internal shroud 5, in the vicinity of the radially external side 15, between two successive blades 1, as shown in FIGS. 3 and 5, so as to act in the region of the upstream face 10 simultaneously on the principal flow E and on the recirculating flow G (which corresponds to the flow of fluid passing through the cavity 8 below the radially internal side 11 of the internal shroud 5 from the downstream face 9A) as illustrated in FIGS. 4 and 6.

Figure 4:
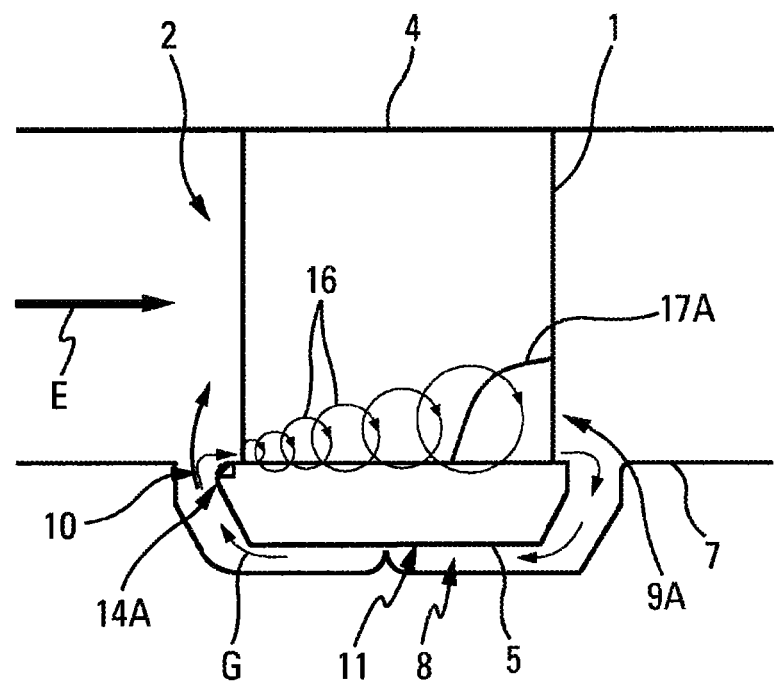
FIG. 4 is a view similar to that of FIG. 2, showing the advantages obtained by the embodiment of FIG. 3.
Figure 6:
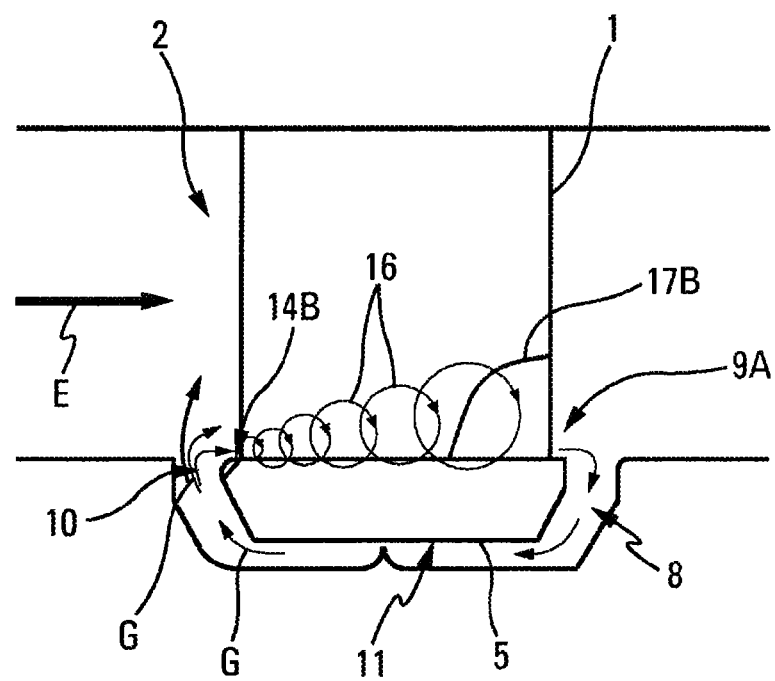
FIG. 6 is a view similar to that of FIG. 2, showing the advantages obtained by the embodiment of FIG. 5.

Said devices 14A, 14B are formed at least so as to generate vortices 16 which permit the stall to be reduced, as illustrated schematically by lines 17A and 17B in FIGS. 4 and 6 which may be compared with the line 12 of FIG. 2. The vortices 16 permit a transfer of energy from the principal flow E to the boundary layers. The boundary layers are thus accelerated. As the low speeds at the foot of the blades 1, on the upper surface 1B, are responsible for the corner vortex, said corner vortex is thus reduced.

The devices 14A, 14B generating vortices 16 thus act simultaneously on the principal flow E and on the recirculating flow G and thus simultaneously on the two aforementioned sources of losses, so as to reduce the losses effectively.

In a first embodiment shown in FIGS. 3 and 4, said individual devices 14A are indentations which are formed directly in the upstream face 10 of the internal shroud 5 and which have the exclusive function of generating vortices 16.

Moreover, in a second preferred embodiment, shown in FIGS. 5 and 6, said individual devices 14B are ribs which are arranged in the vicinity of the upstream face 10 of the internal shroud 5, in the vicinity of said radially external side 15.

Said ribs 14B have a dual function. On the one hand, they generate vortices 16 which reduce corner stall, in the manner of the devices 14A of the first embodiment. On the other hand, said ribs guide the flow at the outlet of the cavity 8, which is mixed with the principal flow in a more uniform manner, creating less stall.

Whatever the embodiment, the reduction of stall which is obtained by means of the invention makes it possible to improve the efficiency of the compressor 3 and contributes to increasing the stability range.

Moreover, a single type of device 14A, 14B makes it possible to control the flow in the cavities below the rectifier and to reduce the associated stall. Moreover, said devices 14A, 14B are fixed or manufactured directly in the platform (internal shroud 5) of the rectifier 2, which limits problems of integration or manufacture.

Within the scope of the present invention, said devices 14A, 14B may be arranged:
- either between two successive blades 1, as shown in FIGS. 3 and 5. In this case, a preferred position may be located one third of the distance along the inter-blade channel, on the upper surface, viewed from the upstream direction;
- or in each case directly in front of a blade 1.

Moreover, said devices 14A, 14B may be provided over the entirety of the circumference or simply over one part of the circumference of the rectifier 2.

Figure 7:
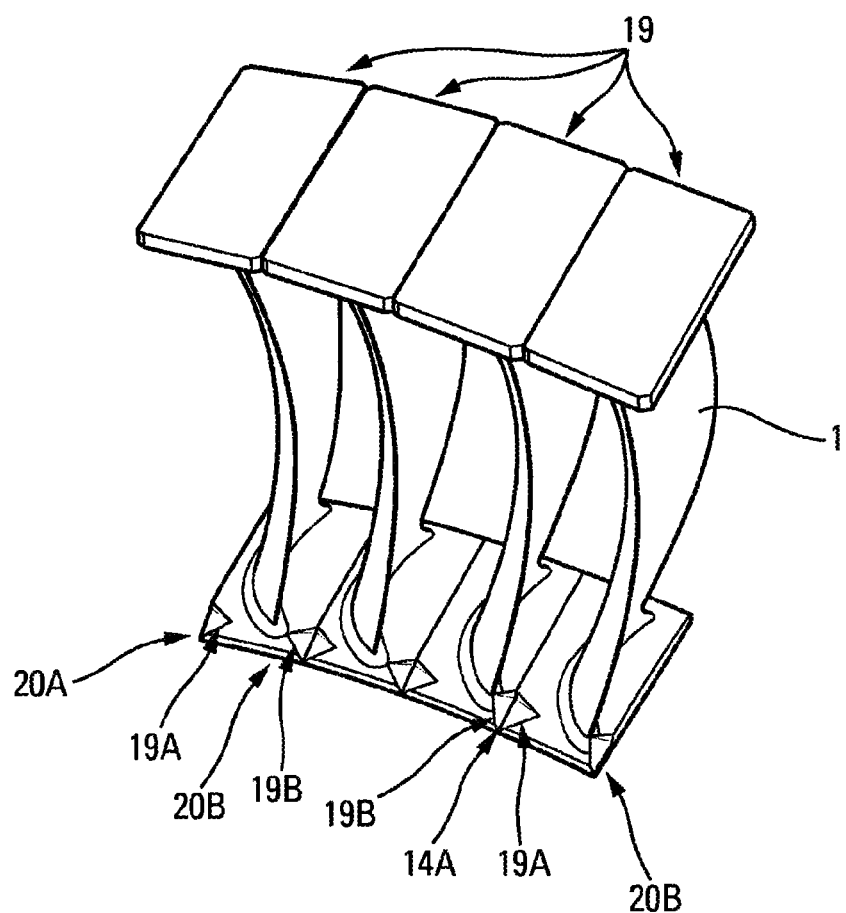
FIG. 7 is a partial perspective view of a variant of a rectifier of a high pressure compressor for a turbomachine comprising devices acting on the flow, according to said first embodiment of the invention.

In a particular embodiment shown schematically in FIG. 7, the rectifier 2 is formed by a plurality of individual structures 19 each comprising a blade 1. Said structures 19 are assembled adjacent to one another so as to form the rectifier 2. In a particular variant, each of said structures 19 is provided with a chamfer 19A and 19B in the region of each of its edges 20A and 20B. Thus, the chamfers 19A and 19B of two adjacent structures 19 in each case form an indentation 14A which is capable of generating vortices 16 as indicated above.

Figure 8:
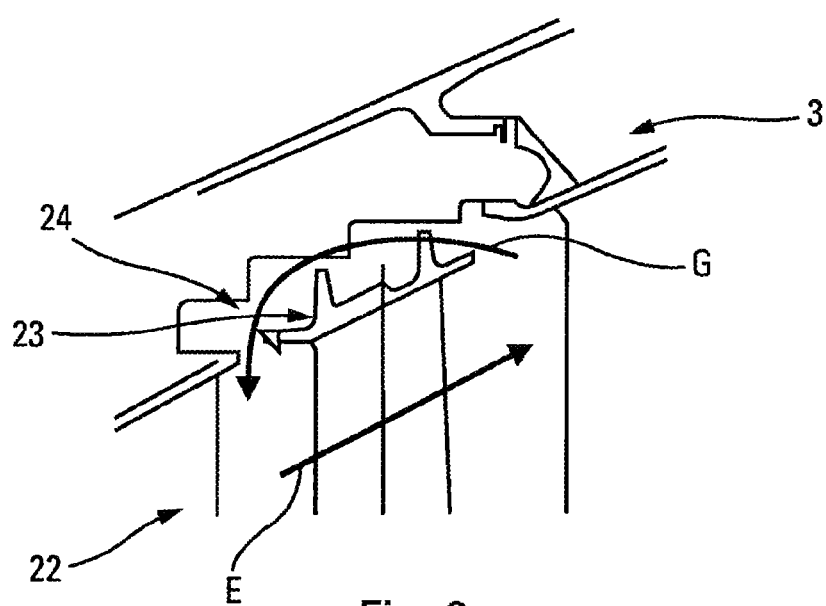
FIG. 8 is a schematic view of a rotor of a high pressure compressor for a turbomachine, to which the present invention may be applied.

Moreover, the present invention may also be applied to a rotor 22 of a turbomachine compressor 3, as shown schematically in FIG. 8.

It is known that the mobile wheel of such a rotor 22 may have at the head, as a stator (or rectifier 2) does at the foot, a shroud 23 and a cavity 24 in which a recirculating flow G may circulate.

The invention may be extended in this case by providing devices generating vortices (shown schematically by triangles in FIG. 8) on the leading edge of the shroud 23 in the same manner as on the internal shroud 5 of the rectifier 2. The features shown above for the rectifier 2 (and in particular the features of the devices generating vortices 14A, 14B) may be implemented in a similar manner on the rotor 22.

The object in this embodiment is the same as for the rectifier 2, namely to reduce losses due to the recirculation and those caused by corner stall.

The invention claimed is:

1. A blade assembly for a turbomachine compressor, said blade assembly comprising:
   a plurality of individual devices acting on a principal flow, which axially flows through blades of said blade assembly, the plurality of individual devices being provided upstream of said blade assembly in a flow path of the principal flow and being formed at least so as to generate vortices; and
   a shroud including a radial surface to which a blade of the blade assembly is attached and at least an upstream s face which is upstream of a leading edge of the blade and around which a recirculating flow passes, said flow coming from a cavity delimited by the shroud, wherein each of said individual devices is arranged on said upstream surface, and wherein each of said individual devices is arrange at the place of said shroud where the recirculating flow is reinjected into the principal flow, in order that said individual devices act simultaneously on the principal flow and on the recirculating flow.

2. The assembly as claimed in claim 1, wherein at least some of said devices comprise indentations which are formed in the upstream surface of the shroud around which said recirculating flow passes and at the place of said shroud where the recirculating flow is reinjected into the principal flow.

3. The assembly as claimed in claim 1, wherein said devices are configured to guide at least said recirculating flow.

4. The assembly as claimed in claim 3, wherein at least some of said devices comprise ribs which are arranged in the region of said upstream surface of the shroud around which said recirculating flow passes and at the place of said shroud where the recirculating flow is reinjected into the principal flow.

5. The assembly as claimed in claim 1, wherein at least sonic of said devices are arranged between two successive blades.

6. The assembly as claimed in claim 1, wherein at least some of said devices are arranged directly upstream of a blade.

7. The assembly as claimed in claim 1, wherein said. assembly is a rectifier for a turbomachine compressor, said rectifier comprising:
   an external shroud and an internal shroud which are coaxial;
   the blades arranged adjacent to one another between said external and internal shrouds, the blades being connected thereto by ends thereof; and
   the plurality of individual devices acting on the flow which are provided on the internal shroud, each of said devices being provided in the region of an upstream face of the internal shroud which is upstream of leading edges of the blades and around which a recirculating flow passes, said flow coining from a cavity delimited by the shroud, in a vicinity of a radially external side of the shroud, in order to act simultaneously on the principal flow and on the recirculating flow which corresponds to the flow of fluid passing below a radially internal side of the internal shroud, coming from a downstream face thereof.

8. The assembly as claimed in claim 7, wherein said rectifier is formed from a plurality of individual structures assembled together, each comprising one of the blades.

9. The assembly as claimed in claim 8, wherein said individual structures are each provided with a chamfer in the region of the edges and the adjacent chamfers each forms an indentation.

10. The assembly as claimed in claim 1, wherein said assembly is a rotor for a turbomachine compressor, said rotor comprising:
   an internal shroud and an external shroud which are coaxial;
   the blades arranged adjacent to one another between said internal and external shrouds, the blades being connected thereto by ends thereof; and
   the plurality of individual devices acting on the flow which are provided on the external shroud, each of said devices being provided in a region of an upstream face of the external shroud which is upstream of leading edges of the blades and around which a recirculating flow passes, said flow coming from a cavity delimited by the shroud, in order to act simultaneously on the principal flow and on the recirculating flow which corresponds to the flow of fluid passing on a radially external side of the external shroud, coming from a downstream face thereof.

11. A turbomachine compressor, comprising at east one blade assembly as claimed in claim 1.

12. An aircraft turbojet engine, comprising at least one compressor as claimed in claim 11.

13. The assembly as claimed in claim 1, wherein the vortices generated by said individual devices transfer energy from the principal flow to boundary. layers so as to accelerate the boundary layers.

14. The assembly as claimed in claim 5, wherein said at least sonic of said devices are arranged between two successive blades, one third of the distance along the inter-blade channel.

15. A blade assembly for a turbomachine compressor, said blade assembly comprising:
   a plurality of individual devices acting on a principal flow, which axially flows through blades of said blade assembly, the plurality of individual devices being provided upstream of said blade assembly in a flow path of the principal flow and being formed at least so as to generate vortices; and
   a shroud including a radial surface to which a blade of the blade assembly is attached and an upstream surface which is upstream of a leading edge of the blade,
   wherein each of said individual devices is arranged on at least the upstream surface of the shroud around which a recirculating flow passes, circulating in a cavity delimited by the shroud, at the place where the recirculating flow is reinjected into the principal flow so that said individual devices act simultaneously on the principal flow and on the recirculating flow, and
   wherein at least some of said devices comprise indentations which are formed in the upstream surface of the shroud around which said recirculating flow passes.

16. A blade assembly for a turbomachine compressor, said blade assembly comprising:
   a plurality of individual devices acting on a principal flow, which axially flows through blades of said blade assembly, the plurality of individual devices being provided upstream of said blade assembly in a flow path of the principal flow and being formed at least so as to generate vortices; and
   a shroud including a radial surface to which a blade of the blade assembly is attached and an upstream surface which is upstream of a leading edge of the blade,
   wherein each of said individual devices is arranged on at least the upstream surface of the shroud around which a recirculating flow passes, circulating in a cavity delimited by the shroud, at the place where the recirculating flow is reinjected into the principal flow so that said individual devices act simultaneously on the principal flow and on the recirculating flow, and
   wherein at least some of said devices comprise ribs which are arranged in the region of said upstream face of a shroud around which said recirculating flow passes.

* * * * *